United States Patent [19]

Lutz et al.

[11] Patent Number: 4,474,274

[45] Date of Patent: Oct. 2, 1984

[54] MOTOR VEHICLE CLUTCH WITH AN INDUCTIVE SIGNAL TRANSMISSION BETWEEN A SENSOR ON THE CLUTCH AND A STATIONARY INDICATOR

[75] Inventors: Dieter Lutz, Schweinfurt; Wolfgang Thieler, Uchenhofen; Albert Katzenberger, Garitz, all of Fed. Rep. of Germany

[73] Assignee: Sachs-Systemtechnik GmbH, Schweinfurt, Fed. Rep. of Germany

[21] Appl. No.: 321,204

[22] Filed: Nov. 13, 1981

[30] Foreign Application Priority Data

Dec. 13, 1980 [DE] Fed. Rep. of Germany ....... 3047086

[51] Int. Cl.³ .................... F01P 65/14; F16D 23/00; F16F 66/00
[52] U.S. Cl. .................... 192/30 W; 188/1.11; 324/83 FM; 200/61.4; 340/52 A; 340/57
[58] Field of Search ................... 192/30 W; 188/1.11; 73/7; 324/83 FM; 340/52 A, 57; 200/61.4

[56] References Cited

U.S. PATENT DOCUMENTS

| 2,514,693 | 7/1950 | Chapman | 192/30 W |
|---|---|---|---|
| 3,040,222 | 6/1962 | Kunz | 324/83 FM X |
| 3,505,595 | 4/1970 | Favre | 340/671 X |
| 3,601,794 | 8/1971 | Blomenkamp et al. | 340/671 X |
| 3,614,732 | 10/1971 | LeJeune | 340/57 X |
| 3,674,114 | 7/1972 | Howard | 340/52 A |
| 3,808,593 | 4/1974 | Kopernik et al. | 340/52 A |
| 3,828,308 | 8/1974 | Kobayashi | 188/1.11 X |
| 3,872,425 | 3/1975 | Kobayashi | 188/1.11 X |
| 4,074,575 | 2/1978 | Bergman et al. | 200/61.4 X |
| 4,166,442 | 9/1979 | Henderson et al. | 192/30 W X |
| 4,332,314 | 6/1982 | Flotow | 192/89 B |

FOREIGN PATENT DOCUMENTS

| 1928218 | 12/1970 | Fed. Rep. of Germany | 188/1.11 |
|---|---|---|---|
| 2716863 | 11/1977 | Fed. Rep. of Germany | 340/57 |
| 2641590 | 3/1978 | Fed. Rep. of Germany | 192/30 W |
| 2640088 | 2/1979 | Fed. Rep. of Germany | |
| 47225 | 4/1977 | Japan | 188/1.11 |
| 2083578 | 9/1980 | United Kingdom | 192/30 W |
| 579470 | 11/1977 | U.S.S.R. | 192/30 W |

Primary Examiner—Rodney H. Bonck
Assistant Examiner—David D. House
Attorney, Agent, or Firm—Toren, McGeady and Stanger

[57] ABSTRACT

A clutch disk of a motor vehicle clutch is provided with a contact element. This contact element is part of a sensing circuit rotating with the clutch disk. This sensing circuit is open as long as the friction pads on the clutch disk are relatively new. Only when the friction pads have been worn to a predetermined degree, the contact element comes into contact with a friction face of the fly wheel disk of the pressure plate of the clutch, so that the sensing circuit is closed. The sensing circuit is connected through a pair of induction coils to a stationary electronic circuitry. This circuitry is influenced by the opening and closing of the sensing circuit and controls indicating means for indicating the degree of wear of the friction pads.

30 Claims, 5 Drawing Figures

FIG. 4
FIG. 5
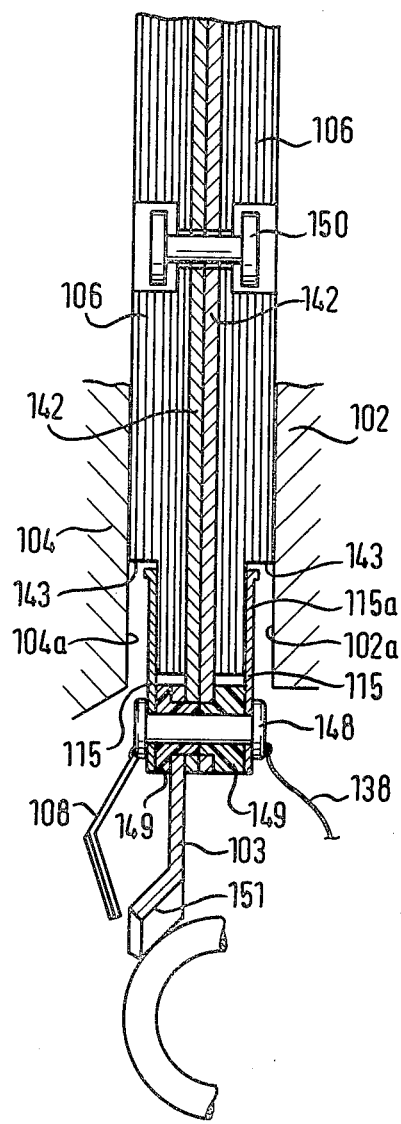
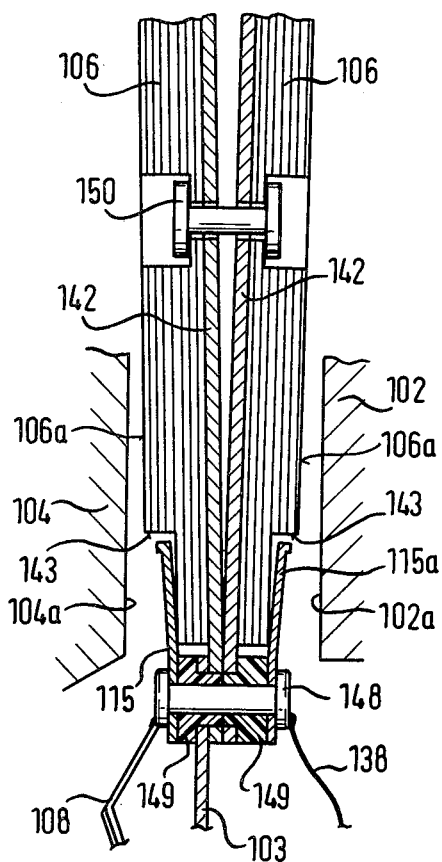

MOTOR VEHICLE CLUTCH WITH AN INDUCTIVE SIGNAL TRANSMISSION BETWEEN A SENSOR ON THE CLUTCH AND A STATIONARY INDICATOR

BACKGROUND

1. Field of the Invention

This invention relates to a motor vehicle clutch and, more specifically, to sensing and indicating means for sensing and indicating, respectively, operational parameters, which occur within said clutch. This invention has particular application to sensing the wear condition of the friction pad fixed to a clutch disk within said clutch. Moreover, this invention is useful for sensing and indicating the temperature within the clutch.

2. The Prior Art

Motor vehicle clutches provided with sensing and indicating means for sensing and indicating the degree of wear, i.e. the reduction of thickness of a friction pad fixed to the clutch disk, are known, for example, from German Patent No. 26 40 088. In this known arrangement the clutch disk with its friction pad is, as commonly known, arranged axially between a fly wheel disk and a pressure plate. The pressure plate is mounted for common rotation with the fly wheel disk and axially movable with respect to the fly wheel disk. The clutch disk with the friction pad is accommodated between the fly wheel disk and the pressure plate. The pressure plate is biased in the axial direction toward the fly wheel disk so that the clutch disk is pressure-engaged between the fly wheel disk and the pressure plate. A stationary housing surrounds the fly wheel disk, the clutch disk and the pressure plate. The fly wheel is axially fixed with respect to this housing. The fly wheel disk is connected to a first shaft and the clutch disk is connected to a second shaft. When the clutch disk is pressure-engaged between the fly wheel disk and the pressure plate, the second shaft is entrained by the first shaft. In order to disengage the second shaft from the first shaft, the pressure plate is lifted from the fly wheel disk against the action of the biasing means. In the engaged condition of the clutch, the axial position of the pressure plate with respect to the housing is determined by the thickness of the friction pad on the clutch disk. Therefore, when the friction pad is worn, this axial position of the clutch disk is modified. In order to obtain an indication of the wear condition of the friction pad on the clutch disk, the axial position of the pressure plate is detected. For detecting this axial position, an induction coil is provided on the stationary housing. The pressure plate is provided with a marking element, which determines the inductivity of the induction coil. When the pressure plate is shifted in axial direction due to wear of the friction pad, the position of the marking element with respect to the induction coil is modified. Therefore, the inductivity of the induction coil is also modified and this inductivity can be measured by electrical circuitry. The result of this measurement represents the wear condition of the friction pad.

This known arrangement is not fully satisfactory, because frequently the axial position of the pressure plate is not exclusively dependent on the thickness of the friction pad. Therefore, the position of the pressure plate is not a reliable measure of the wear condition of the friction pad. The position of the pressure plate may be dependent, for example, also on mechanical oscillations occurring in the clutch arrangement. A further disadvantage of the known arrangement is that it is hardly possible to control the wear condition of the friction pad on the whole periphery thereof and to control the wear condition in a plurality of friction pads in cases in which several friction pads are distributed on the clutch disk about the axis thereof. Moreover, it is not possible to observe other operational parameters within the clutch disk which might be of interest, for example the temperature of the clutch disk.

SUMMARY

It is, therefore, an object of the invention to provide a clutch disk which provides a more precise observation of the wear condition of one or more friction pads provided on the clutch disk.

Another object of the invention is to observe the wear condition of the friction pad or friction pads in various locations of their friction faces.

Still another object of this invention is to provide a possibility by observing other interesting operational parameters within the vehicle clutch, particularly the operational temperature of the clutch disk.

The motor vehicle clutch of this invention comprises a fly wheel disk mounted to the end of a first shaft. A clutch housing is fixed to the fly wheel disk. This clutch housing comprises a bottom wall having axial distance from the fly wheel disk. This bottom wall is provided with a central opening which is substantially in alignment with the first shaft. The fly wheel and the clutch housing define a clutch chamber. A pressure plate is housed within this clutch chamber. This pressure plate is connected to the fly wheel disk for common rotation therewith and is axially movable with respect to the fly wheel disk. A clutch disk having at least one friction pad is accommodated in the axial direction between the fly wheel disk and the pressure plate. Biasing means are supported by the clutch housing and bias the pressure plate towards the fly wheel disk such that the clutch disk is pressure-engaged between the fly wheel disk and the pressure plate. A second shaft in substantial alignment with the first shaft is connected with the clutch disk for common rotation therewith; the clutch disk is, however, axially movable with respect to said second shaft. By the clutch disk and the second shaft, the movement of the fly wheel disk can be transmitted to a load unit, for example, the gear box of the motor vehicle through the central opening of the clutch housing. The pressure plate can be lifted from the fly wheel disk by clutch releasing means against the action of the biasing means, so that the clutch disk can be disengaged from the fly wheel and the pressure plate. Sensing means are provided within the clutch chamber for sensing operational parameters occurring within said clutch chamber. These sensing means are connected to indicating means which are provided outside the clutch chamber for giving an indication of said operational parameters. The sensing means and the indicating means are interconnected by electrical transmission means. These electrical transmission means comprise an inductive transmission unit.

In view of the above mentioned objects, the electric transmission means comprise, according to this invention, a first induction coil which is connected or connectable to the fly wheel disk for common rotation therewith. A stationary second induction coil is positioned in a position of inductive interaction with said first induction coil. The electric transmission means on their way to said indicating means pass through the central opening of the bottom wall of said clutch housing.

Preferably, said second induction coil is provided on a part of the clutch releasing means.

The second induction coil may be connected to an oscillator. Under these circumstances, the first induction coil and the sensing means may define a load circuit for said oscillator, which load circuit is connected to said oscillator through said induction coils. The electrical properties of this load circuit are varied by the sensing means. The electrical behavior of the oscillator is varied by variations of the electrical properties of the load circuit. Variations of the electrical behavior of the oscillator control the indicating means. In the load circuit, the first induction coil and the sensing means may be connected in series. The sensing means can work as a switch, which alternatively opens or closes the load circuit so that the oscillator is either damped or not damped.

The oscillator may be shifted in its oscillation phase, when the electrical properties of the load circuit are varied. A phase discriminator may be connected to the oscillator in order to determine the oscillation phase of the oscillator and to produce a signal corresponding to the phase shift, which signal also represents the variation of the electrical properties of the load circuit caused by the respective condition of the sensing means.

BRIEF DESCRIPTION OF THE DRAWINGS

For a better understanding of the invention reference may be made now to the following detailed description of an exemplary embodiment thereof, in which:

FIG. 4 shows a detail of the vehicle clutch of FIG. 3 in the engaged condition; and FIG. 5 shows the detail of FIG. 4 in the release condition of the vehicle clutch.

DETAILED DESCRIPTION

Figure 1:
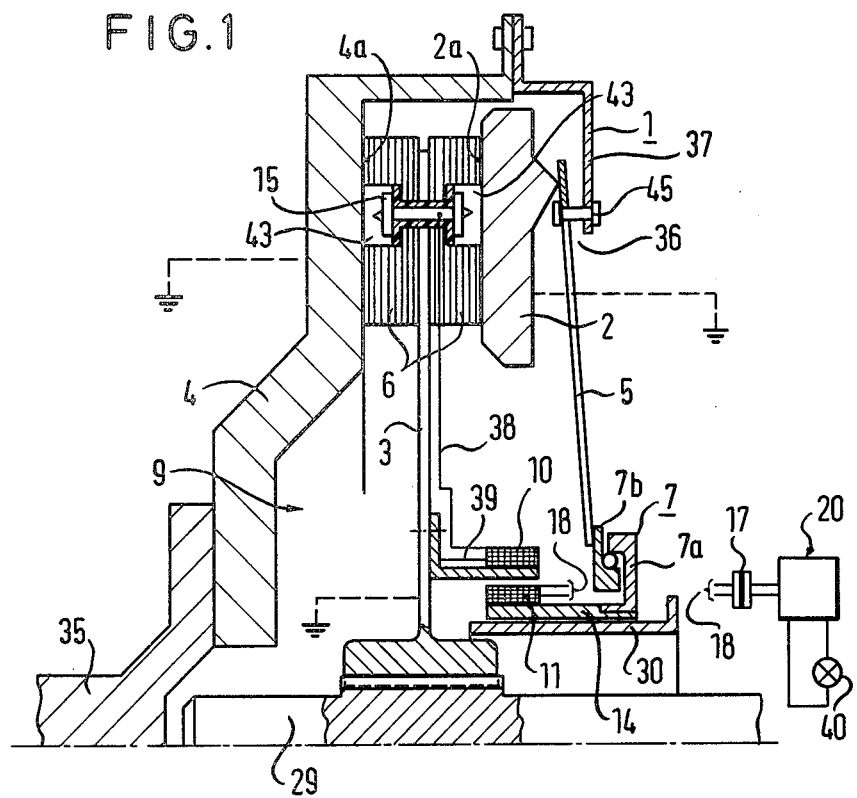
FIG. 1 diagrammatically illustrates a clutch disk with sensing means according to this invention.

In FIG. 1 a fly wheel disk is designated 4. This fly wheel disk 4 is connected to a first shaft or driving shaft 35. A clutch housing 1 is fixed to the fly wheel disk 4 so as to define a clutch chamber 9. The clutch housing 1 comprises a bottom wall 37, which bottom wall 37 has a central opening 36. A pressure plate 2 is housed within the clutch chamber 9. The pressure plate 2 is connected by non-illustrated tangential connection means to the fly wheel disk 4 and/or to the clutch housing 1 so that the pressure plate 2 rotates together with the fly wheel disk 4 and the clutch housing 1. The pressure plate 2 is, however, axially movable with respect to the fly wheel disk 4. A diaphragm spring 5 is supported on the clutch housing 1 by support members 45. The diaphragm spring 5 urges the pressure plate 2 towards the fly wheel disk 4. The fly wheel disk 4 is provided with a friction face 4a and the pressure plate 2 is provided with a friction face 2a. A second or driven shaft 29 which is substantially in alignment with the first or driving shaft 35 enters into the clutch chamber 9 through the central opening 36. A clutch disk 3 is mounted on the second shaft 29 for common rotation therewith. This clutch disk 3 is axially movable with respect to the second shaft 29. Friction pads 6 are fixed on both sides of the clutch disk 3. These friction pads 6 are engaged by the friction faces 4a and 2a under the action of the diaphragm spring 5. A stationary guiding tube 30 surrounding the second shaft 29 enters into the clutch chamber 9 through the central opening 36. On this guiding tube 30, there is slidably mounted a non-rotatable sliding sleeve 14. On the sliding sleeve 14, there is mounted a release bearing 7 by a first bearing ring 7a. A second bearing ring 7b freely rotatable with respect to the first bearing ring 7a is provided for engagement of the radially inner edge of the diaphragm spring 5. When the sliding sleeve 14 is moved to the left, as seen in FIG. 1, the radially outer edge of the diaphragm spring 5 is lifted from the pressure plate 2 so that the clutch disk 3 with the friction pads 6 is released from frictional engagement with the friction faces 4a and 2a.

As can be seen from FIG. 1 the friction pads 6 are provided with recesses 43. A contact element 15 in the form of a rivet passes through the clutch disk 3 and the friction pads 6, the heads of said contact element 15 being housed within the recesses 43. It is to be noted that in the illustration as shown in FIG. 1, the friction pads 6 are relatively new and not worn. In this condition, the heads of the contact element 15 have axial distance from the friction faces 4a and 2a even when the friction pads 6 are pressure-engaged between the friction faces 4a and 2a. The contact element 15 is electrically insulated from the clutch disk 3.

On the clutch disk 3, there is mounted a first induction coil 10. One end of this induction coil 10 is connected by an insulated line 38 to the contact element 15. The other end of the first induction coil 10 is connected by a line 39 to the clutch disk 3. The fly wheel disk 4, the pressure plate 2, and the clutch disk 3 are electrically connected with each other.

As can be seen from FIG. 1, the electrical circuit containing the first induction coil 10 is open when the friction pads 6 are new. Only after the friction pads 6 have been worn to a predetermined degree, the contact element 15 comes into contact with the friction face 4a and/or with the friction face 2a so that the circuit of the first induction coil 10 is closed. This is well understandable from FIG. 2.

A second induction coil 11 is mounted on the non-rotatable sliding sleeve 14. This second induction coil is concentric with respect to the first induction coil 10 such that inductive interaction exists between the coils 10 and 11. The second induction coil 11 is connected by lines 18 to an oscillator 22, as can be seen from FIG. 2. The oscillator 22 is part of an electronic circuitry 20 which is provided outside the clutch. In order to facilitate the assembling, plug connections 17 are provided in the lines 18. The oscillator 22 is connected to a phase discriminator 23 which is additionally connected to a reference oscillator 24. The phase discriminator 23 is connected to an electromagnetic driver 25 which is to open and close a switch 26 in the circuit of an indicating lamp 40. The various electrical components 22, 24, 23 and 25 of the electronic circuitry 20 may be supplied with electrical power from the electrical power supply 27 of the respective vehicle through a filter 21.

As long as the contact element 15 is out of contact with the friction faces 4a and/or 2a, the circuit of the first induction coil 10 is open. This means that no substantial external load is connected to the oscillator 22 through the induction coils 10 and 11. Under these circumstances, the oscillation phase of the oscillator 22 and the oscillation phase of the reference oscillator 24 are identical. The phase discriminator 23 supplies, therefore, no output signal to the electromagnetic driver 25, so that the switch 26 remains open. When one of the friction pads 6 has been worn to such an extent that the contact element 15 comes into electrical contact with either the fly wheel disk 4 or the pressure plate 2, the circuit of the first induction coil 10 is closed, so that a load is connected to the oscillator 22 through the induction coils 10 and 11 and the oscillation of the oscillator 22 is damped. This damping of the oscillator results in a phase shift. The phase difference between the oscillator 22 and the reference oscillator 24 is discriminated by the phase discriminator 23, so that an output signal is supplied to the electromagnetic driver 25, and the switch 26 is shut. The lamp 40 is, therefore, illuminated and gives to the driver of the vehicle a signal saying that one of the friction pads has been worn to such a degree that the clutch disk must be replaced.

It is to be noted that a plurality of contact elements 15 may be distributed about the periphery of the clutch disk 3, so that the wear condition of the friction pads can be observed at any location thereof. It is further to be noted that the contact element 15 engages the friction faces 4a and 2a in an area which is also subject to wear. While the wear of the friction pads 6 is much greater than the wear of the faces 4a and 2a, this is highly desirable because wear of the friction faces 4a and 2a are automatically compensated for, so that a signal appears always at the same degree of wear of the contact element 15, irrespectively of the degree of wear of the friction faces 4a and 2a.

Figure 2:
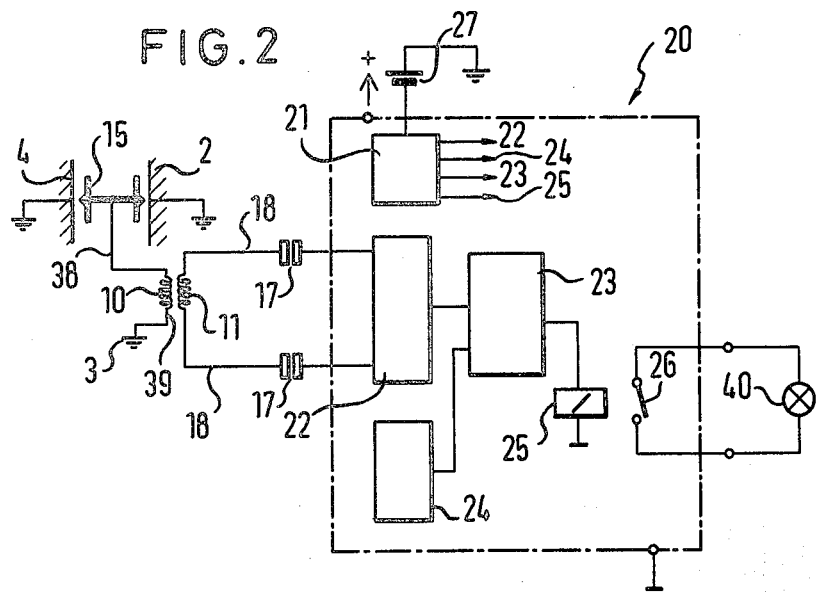
FIG. 2 shows the electrical transmission means between the sensing means and the indicating means.
Figure 3:
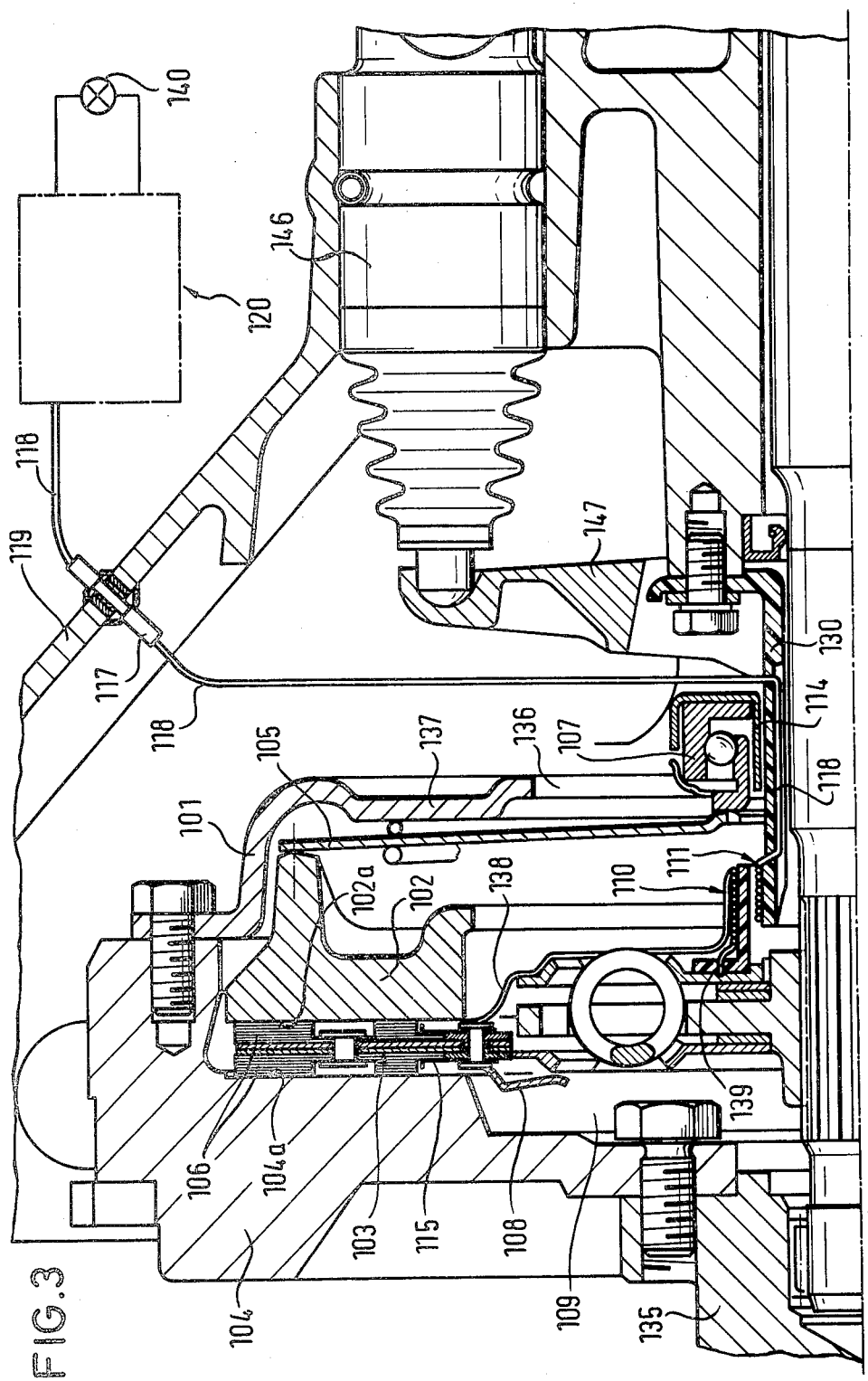
FIG. 3 shows in more detail another embodiment of the vehicle clutch of this invention.

In the embodiment of FIG. 3 analogous parts are designated by the same reference numbers as in FIG. 1 and 2 increased by 100. One can see in FIG. 3 that the sliding sleeve 114 is movable by a hydraulic actuating cylinder 146 which is connected to the sliding sleeve 114 by a lever 147. One can further see from FIG. 3 that the plug connection 117 is provided on a housing 119 which includes the clutch and which may be part of the gear box housing.

Further details may be seen from FIG. 4 and 5. FIG. 4 shows the pressure-engaged condition of the clutch disk 103, whereas FIG. 5 shows the released condition. According to FIGS. 4 and 5, the friction pads 106 are mounted on leaf springs 142 which are fixed to the clutch disk 103 by rivets 148. In the released condition, as shown in FIG. 5, the leaf springs 142 have axial distance from each other. In the pressure-engaged condition, as shown in FIG. 4, the leaf springs 142 are in full face contact. The friction pads 106 are provided with local recesses 143 at their radial inner edges. The contact elements 115 are fixed to the clutch disk 103 by the above-mentioned rivet 148, insulation sleeves 149 surrounding said rivet so as to electrically insulate the contact elements 115 from the metallic clutch disk 103. It is to be noted that the recesses 143 in the engagement faces 106a extend only over part of the thickness of the friction pads 106. The contact elements 115 are provided with elastically deflectable extensions 115a which contact, as seen in FIG. 4, the bottom faces of the recesses 143. When the clutch is disengaged, as shown in FIG. 5, the extensions 115a are deflected by the bottom faces of the recesses 143. It is to be noted, however, that in spite of this deflection no electrical contact of the extensions 115a is possible with the friction faces 104a and 102a as long as the friction pads 106 are new. Only when the friction pads 106 have been worn to a predetermined degree, the extensions 115a in FIG. 4 come into contact with the friction faces 104a and 102a.

It is to be noted that this solution as shown in FIG. 4 and 5 is highly desirable for the following reasons: For the reasons mentioned above, it is desirable to have the contact elements 115 contact the friction faces 104a and 102a at locations of these friction faces which are subject to friction and therefore to wear for automatically compensating for the wear of the friction faces 104a and 102a. This makes it necessary to provide the recesses 143 for accommodating the extensions 115a. In theory, it would be possible to extend the recesses 143 through the total thickness of the friction pads 106. In this case, however, the friction pads which are subject to very high centrifugal forces would be undesirably weakened. This is the reason why according to FIG. 4 and 5 the recesses 143 extend only over part of the thickness of the friction pads 106. As on the other hand the extensions 115a should be supported by the bottom faces of the recesses 143 in order to make reliable contact with the friction faces 104a and 102a, it results that the extensions 115a are moved by the axial movement of the friction pads 106, which occurs on transitions between the pressure-engaged condition, as shown in FIG. 4, and the released condition, as shown in FIG. 5. This axial movement of the friction pads 106 is in practice, however, only in the order of size of 0.6 mm.

Rivets 150 which are diagrammatically shown in FIG. 4 and 5 define the maximum distance of the leaf springs 142 in the released condition and may be simultaneously used for fixing the friction pads 106 to the leaf springs 142 as is common in the art.

The electric transmission means are the same for the embodiment of FIG. 3 to 5 as shown in the embodiment of FIG. 1 and 2.

As can be seen from FIG. 3, 4 and 5, a bimetal strip 108 has been fixed to the rivet 148, for example by soldering. This bimetal strip 108 is subject to a temperature nearly identical with the temperature of the clutch disk 103. As long as the temperature of the clutch disk 103 in operation is below a predetermined value, the bimetal strip 108 remains insulated. Only when this predetermined temperature is exceeded, the bimetal strip 108 contacts the abutment tongue 151 of the clutch disk 103. So the circuit of the first induction coil 10, as shown in FIG. 2, is closed and the signal lamp 40 is also illuminated. The driver is, therefore, informed also if the temperature of the clutch disk 103 exceeds a predetermined value. It is well understandable that separate circuits can be used for indicating the degree of wear of the friction pads and for indicating the temperature of the clutch disk.

Although the invention has been described and illustrated herein by reference to specific embodiments thereof, it will be understood that many modifications and variations of such embodiments may be made without departing from the inventive concepts disclosed. For example, while a contact element 15 has been shown as sensing means in the embodiment of FIG. 1, also capacitive sensing means may be provided. All such modifications and variations, therefore, are intended to be encompassed within the spirit and scope of the appended claims.

We claim:

1. In a motor vehicle clutch comprising
   (a) a driving disk (4) connected to a first shaft (35);
   (b) a clutch housing (1) connected to said driving disk (4), said clutch housing (1) being provided with a bottom wall (37) in axial distance from said driving disk (4), said bottom wall (37) being provided with a central opening (36) being substantially aligned with said first shaft (35), said drive disk (4) and said clutch housing defining a clutch chamber (9);

(c) a pressure plate within said clutch chamber (9), said pressure plate (2) being connected with said driving disk (4) for common rotation therewith and being axially movable with respect to said driving disk (4);

(d) a clutch disk (3) within said clutch chamber (9), said clutch disk (3) being accommodated in axial direction between said driving disk (4) and said pressure plate (2);

(e) biasing means (5) supported by said clutch housing (1) and biasing said pressure plate (2) towards said driving disk (4) such that said clutch disk (3) is pressure-engaged between said driving disk (4) and said pressure plate (2) in view of transmitting a torque from said driving disk (4) to said clutch disk (3);

(f) a second shaft (29) in substantial alignment with said first shaft (35), said clutch disk (3) being connected to said second shaft (29) for torque transmission and being axially movable with respect to said second shaft (29);

(g) clutch releasing means (30, 14, 7) for lifting said pressure plate (2) from said driving disk (4) against the action of said biasing means (5);

(h) sensing means (15) for sensing an operational parameter of said clutch occurring within said clutch chamber (9);

(i) stationary indicating means (40) outside said clutch chamber (9) for supplying an indication of said operational parameter; and (k) electrical transmission means (38, 39, 10, 11, 18, 20) between said sensing means (15) and said indicating means (40), the improvement comprising:
the electrical transmission means (38, 39, 10, 11, 18, 20) comprise a first induction coil (10) connectable to said driving disk (4) for common rotation therewith and a second stationary induction coil (11) located for inductive interaction with said first induction coil (10), said electrical transmission means (38, 39, 10, 11, 18, 20) passing through said central opening (36) of said bottom wall (37).

2. The clutch of claim 1, wherein said sensing means (15) are intended for sensing the axial position of said clutch disk (3) with respect to at least one of said driving disk (4) and said pressure plate (2) when said clutch disk (3) is pressure-engaged between said driving disk (4) and said pressure plate (2).

3. The clutch of claim 2, wherein said clutch disk (3) is provided with at least one friction pad (6) on at least one of its sides, said friction pad (6) having a thickness reduceable by frictional wear, said sensing means (15) being intended for sensing the thickness of said friction pad (6).

4. The clutch of claim 3, wherein said sensing means (15) comprising a contact unit (15) mounted on said clutch disk (3) in electric insulation therefrom and being shaped and located in such a way as to be adapted for being brought into electric contact with both said driving disk (4) and said pressure plate (2) after the respective friction pad (6) has been reduced in thickness by frictional wear to a predetermined value.

5. The clutch of claim 4, wherein said sensing means (108) are additionally intended for sensing a temperature occurring within said clutch chamber (109).

6. The clutch of claim 5, wherein said sensing means (108) are additionally intended for sensing the temperature of said clutch disk (103).

7. The clutch of claim 6, wherein said sensing means (108) comprise a temperature-responsive bi-metal switch.

8. The clutch of claim 7, wherein said temperature-responsive bi-metal switch (108) is in direct electrical contact with said contact unit (115).

9. The clutch of claim 3, wherein said sensing means comprise a contact element (15), said contact element (15) is to contact a friction face (4a, 2a) of the respective one of said driving disk (4) and said pressure plate (2), said friction face (4a, 2a) being in frictional engagement with said friction pad (6).

10. The clutch of claim 9, wherein said contact element (15) is part of a fixing member for fixing said friction pad (6) onto said clutch disk (3).

11. The clutch of claim 2, wherein said sensing means comprise a contact element (15) mounted on said clutch disk (3), said contact element (15) being electrically insulated from said clutch disk (3) and being intended for making contact with at least one of said driving disk (4) and said pressure plate (2).

12. The clutch of claim 1, wherein said sensing means (108) are intended for sensing a temperature occurring within said clutch chamber (109).

13. The clutch of claim 12, wherein said sensing means (108) comprises a bimetal strip.

14. The clutch of claim 13, wherein said bimetal element is an electrical contact element which contacts an electrically conductive abutment member (151) when the temperature of said clutch disk (103) exceeds a predetermined value.

15. The clutch of claim 12, wherein said sensing means (108) are intended for sensing the temperature of said clutch disk (103).

16. The clutch of claim 1, wherein said second induction coil (11) is connected to an oscillator (22), said first induction coil (10) and said sensing means (15) being part of a load circuit (15, 4, 3, 39, 10, 38) connected to said oscillator (22) through said induction coils (10, 11), the electrical properties of said load circuit (15, 4, 3, 39, 10, 38) being variable by said sensing means (15) in response to variation of said operational parameter, the electrical behavior of said oscillator (22) being influenced by the variations of the electrical properties of said load circuit (15, 4, 3, 39, 10, 38), variations of the electrical behaviour of said oscillator (22) being used for controlling said indicating means (40).

17. The clutch of claim 16, wherein the oscillation phase of said oscillator (22) is shiftable by variation of the electrical properties of said load circuit (15, 4, 3, 39, 10, 38), and said oscillator (22) is connected to a phase discriminator (23), which phase discriminator (23) controls said indicating means (40).

18. The clutch of claim 17, wherein said phase discriminator (23) is connected to an additional reference oscillator (24) so as to detect the phase shift between said oscillator (22) and said reference oscillator (24).

19. The clutch of claim 16, wherein said load circuit (15, 4, 3, 39, 10, 38) contains said first induction coil (10) and said sensing means (15) in series connection, said sensing means (15) operating as an interrupter switch.

20. The clutch of claim 1, wherein said second induction coil (11) is mounted on a portion (14) of said clutch releasing means (30, 14, 7).

21. The clutch of claim 20, wherein the clutch releasing means (30, 14, 7) comprise an axially movable sliding sleeve (14), said second induction coil (11) being mounted on said sliding sleeve (14).

22. The clutch of claim 20, wherein said clutch releasing means (130, 114, 107) comprise a clutch releasing bearing (107) which is guided on a stationary guiding tube (130), said second induction coil (111) being mounted on said guiding tube (130).

23. The clutch of claim 1, wherein said first induction coil (10) is mounted on said clutch disk (3) for common rotation therewith.

24. The clutch of claim 23, wherein said electrical transmission means (38, 39, 10, 11, 18, 20) comprises plug connection means (17).

25. The clutch of claim 24, wherein said plug connection means (17) are mounted on a housing (119) enclosing said clutch.

26. The clutch of claim 1, wherein both said first (10) and said second (11) induction coils being concentric with said first shaft (35).

27. The clutch of claim 26, wherein one of said first (10) and said second (11) induction coils being inside the other of said induction coils (10, 11).

28. The clutch of claim 1, wherein said electrical transmission means (38, 39, 10, 11, 18, 20) are powersupplied by the electrical power supply (27) of the respective vehicle through a filter (21).

29. The clutch of claim 1, wherein at least one friction pad (106) is mounted on at least one side face of said clutch disk (103) by an axially deflectable friction pad carrier (142), said friction pad carrier (142) being axially deflected when said clutch disk (103) is pressure-engaged between said driving disk (4) and said pressure plate (2), said friction pad (106) being provided with a recess (143) in its frictional engagement face (106a), said recess (143) extending in the axial direction only over a part of the thickness of said friction pad (106), said sensing means comprising a contact element (115), said contact element (115) comprising an elastic extension (115a) which is elastically deflectable in the axial direction and extends into said recess (143), said extension (115a) being deflectable by the bottom face of said recess (143) when said clutch disk (103) is releasing from pressure-engagement between said driving disk (104) and said pressure plate (102), this deflection of said extension (115a) being limited such that no electrical contact with the respective one of said driving disk (104) and said pressure plate (102) occurs as long as the thickness of said friction pad (106) has not been reduced below a predetermined thickness.

30. The clutch of claim 1, wherein said first induction coil (10) being connected in series with said sensing means (15) and with the a conductive portion of at least a part of said clutch.

* * * * *